April 26, 1966 C. ROSSITTO ET AL 3,247,536
ADHESIVE BONDING OF RUBBERY MATERIALS
Filed Nov. 21, 1962
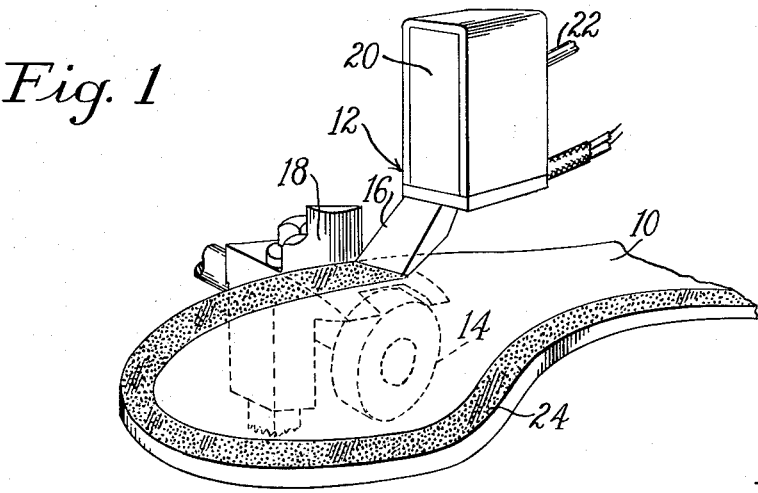
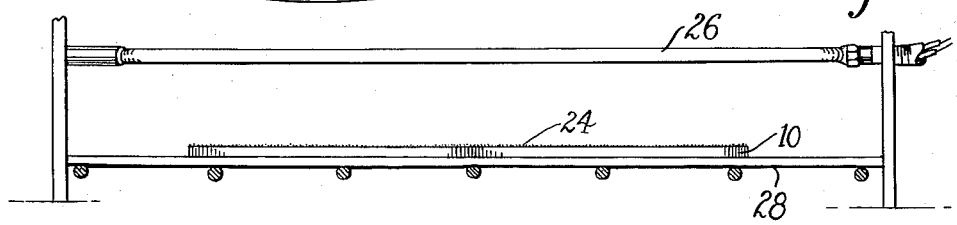
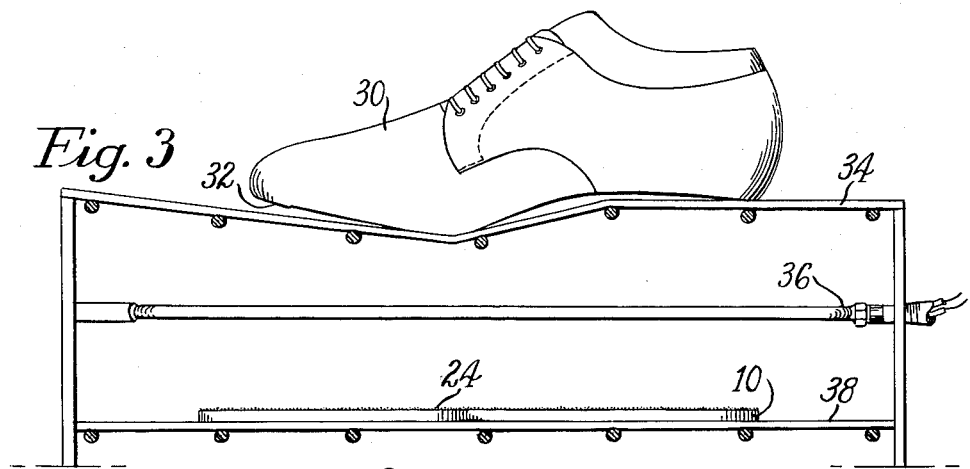
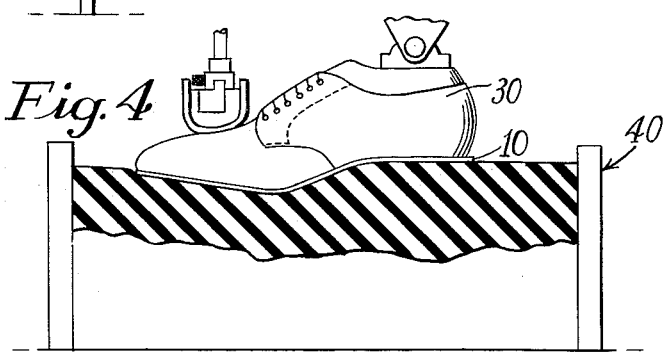
*Inventors*
Conrad Rossitto
Joseph W. Jolly, Jr.
By their Attorney
Benjamin C. Pollard United States Patent Office 3,247,536
Patented Apr. 26, 1966

3,247,536
ADHESIVE BONDING OF RUBBERY MATERIALS
Conrad Rossitto, Andover, and Joseph W. Jolly, Jr., Topsfield, Mass., assignors to United Shoe Machinery Corporation, Boston, Mass., a corporation of New Jersey
Filed Nov. 21, 1962, Ser. No. 239,304
5 Claims. (Cl. 12—142)

This invention relates to adhesive processes and particularly to processes for the adhesive attachment of shoe soles of rubbery material to shoe uppers.

In copending application Serial No. 121,118, filed June 30, 1961, now Patent No. 3,168,744, entitled "Adhesive Process, Adhesive and Adhesive Bonded Outsole," in the name of Conrad Rossitto, one of the inventors of the present application, there is disclosed a process in which a band of adhesive in molten condition is deposited on the attaching marginal areas of a sole. Thereafter the band of adhesive and the underlying sole material are heated by radiant heat to soften the adhesive and the sole is pressed against the bottom of a shoe upper which has also been heated. The adhesive wets or penetrates the attaching surface of a shoe upper and thereafter sets rapidly to form a strong attachment between the shoe upper and the sole.

With natural or synthetic rubber outsole materials it has been found important in the process of the copending application to provide a primer coat on the attaching surface of the outsole to improve the union between the thermoplastic adhesive and the outsole. Primers are ordinarily volatile solvent solutions of materials such as chlorinated rubber and the application of a primer thus involves additional steps not only of applying the primer but also of allowing the primer to dry and elimination of the solvent vapors.

It is an object of the present invention to provide a process in which natural or synthetic rubber materials, particularly outsoles which will be referred to as "cured diene rubber" materials, may be attached to surfaces, for example, shoe uppers, without the use of a primer.

To this end and in accordance with a feature of the present invention, and at least partially radiant heat transparent band of thermoplastic adhesive is deposited on the surface of a cured diene rubber body to be adhered such as the attaching surface of a cured diene rubber outsole, and the association of the adhesive and outsole surface is strengthened and made more uniform through a special heat treatment which insures that heat softened diene rubber material is available in contact with molten adhesive for coaction with the deposited adhesive. This heat treatment is provided at a stage allowing the diene rubber material to become firm against serious distortion before pressing the material with molten adhesive thereon against another surface such as a heated attaching surface of a shoe upper to form a permanent bond.

The invention will be described further in connection with the attached drawings in which:

FIG. 1 is a diagrammatic angular view with parts broken away of an outsole cementer disposing a band of molten adhesive on the attaching margin of an outsole;

FIG. 2 is a diagrammatic elevational view showing radiant heating of the adhesive band and outsole;

FIG. 3 is a diagrammatic elevational view showing activation of the adhesive band by radiant heating and the heating of a bottom of a shoe upper; and FIG. 4 is a diagrammatic elevational view showing the bonding of an outsole to a shoe upper in a sole attaching press.

It has been found that an excellent bond between a deposited band of thermoplastic adhesive and the surface of a cured diene rubber material may be secured without the aid of a primer by heating the surface of the diene rubber material to a softened condition in which it can associate more effectively with the deposited thermoplastic adhesive. This additional heat may be supplied either by heating the attaching surface before deposition of the band of molten thermoplastic adhesive or by heating the band of adhesive and surface thereunder after the band of adhesive is formed.

Although applicants do not wish to be bound by a theory of operation, it appears that effective union between the molten adhesive and the cured diene rubber material requires that the molecules at the surface of the diene rubber material be in a state of activity and freedom of motion in order that they may associate with and the surface be wetted effectively by the molten adhesive. But whether this explanation be a complete or accurate picture, a marked increase in bond strength and uniformity is secured through this heating.

A major field of utility of the present invention is the attachment of cured diene rubber outsoles to shoe uppers and the invention will be described in connection with this field; but it is to be understood that the invention is capable of use in other relations.

Application of adhesive to an outsole 10 is ordinarily effected by means of an outsole cementing machine 12 in which the outsole 10 is moved by means of a drive wheel 14 at a determined rate beneath an applicator nozzle 16 and is maintained in desired relation to the nozzle during application by a guide 18. In the device shown, molten cement for the nozzle 16 is supplied from a melting device 20 adapted for handling a rod or strand 22 of thermoplastic adhesive; but it is to be understood that other molten adhesive supplies may be used where the nature of the adhesive permits.

As shown in FIG. 1 the cementer 12 applies a band 24 of adhesive extending around at least the forward portion of the outsole 10 and it may extend around the entire margin of the outsole depending on the shoe construction involved. The deposited band of adhesive may be of the order of from about 0.005 to about 0.05" in thickness; preferably from about 0.010 to about 0.020". It is to be observed that although this thickness may not differ greatly from the thickness of bands of adhesive solution heretofore used in outsole cementing, the present solvent-free band of adhesive contains a significantly greater quantity of adhesive per unit thickness since it is 100% solids and is not diminished by the evaporation of volatile solvents.

The additional heat employed to bring the surface of the outsole to condition for association with the deposited adhesive is ordinarily about that temperature at which the diene rubber material becomes soft and readily deformable. This heating may be obtained by disposing the outsole 10 on a rack 24 for exposition to a radiant heating unit 26 as shown in FIG. 2. In general it is desired that the radiant heating be relatively intense and of short duration in order that the surface of the sole 10 may be brought rapidly to the desired temperature without softening the diene rubber sole material throughout its entire thickness. This heating will raise the surface temperature of the outsole material to at least about 50° C. and preferably above about 95° C. It has also been found that because of the unavoidable softening of the outsole material by this heating step, it is preferable to heat the surface of the outsole 10 after the band 24 of cement has been applied and while the cement is still molten so that at the time of application of the cement the diene rubber sole material is sufficiently firm and smooth for feeding by the drive wheel 14.

The extent of heating to improve the union between molten adhesive and outsole material is such that the diene rubber outsole 10 becomes so readily deformable that sole attaching pressure would give an undesired bottom character when pressed in a sole attaching press and would require an undesirable long press time before the adhesive would harden to condition holding the sole firmly to an upper.

After the cement applying and heating steps, the outsole 10 is ordinarily allowed to cool and the adhesive is solidified.

The thermoplastic adhesives used for outsole attaching according to the present method are of the same general character as those in the process of the copending application referred to above. The adhesives are thermoplastic at least to the extent that they do not set up prior to the completion of the heating operations involved in the present process; and it has been found desirable that the adhesives have a wide temperature range preferably at least 20° C. in which they are visco-elastic when cooled from molten condition. The term "visco-elastic" refers to a condition in which the adhesive is somewhat rubbery but deformable and flowable under pressure in order that it may avoid excessive "squeeze out" under the high pressures involved in sole attaching while at the same time permitting limited slip of an outsole relative to an upper to allow accurate positioning of the outsole. The temperature range in which the visco-elastic condition in the preferred adhesive occurs may be from about 10° to about 60° below the melting point of the adhesive; and the adhesive will harden to a tough strong condition at temperature at least as high as 40° C. Although it is possible to use resinous adhesives having melting points as high as those used in the prior application, it is preferred to use resins having somewhat lower softening and melting points. Ball and ring method softening points (at which the ball will penetrate ⅓ through the ring) of 50° to 120° C. and melting points (at which the ball will drop through the ring) of 80° to 160° C. are preferred.

Resins which have been found useful include the polyesters from reaction of dicarboxylic acids and glycols, polyesteramides, for example, adipic polyesteramides in which the hydroxy component is 1,6 hexane diol, 1,4 butane diol or ethylene glycol, stereo-specific catalyzed polymers of vinyl alkyl ethers where the alkyl group has from 1 to 4 carbon atoms, polymers and copolymers of lower alkyl acrylates and methacrylates. Resins having molecular weights preferably above about 5000 and not over about 50,000 have been preferred in order that they may have the necessary fluidity for spreading, wetting and penetration. Mixtures of polymeric materials having molecular weights above this value, with resins of lower molecular weight may be compounded to approximate the physical properties of the preferred resins for use in the present process.

A useful class of adhesives is that of the polyesters, for example, terephthalates, isophthalates, sebacates, succinates, etc. Preferred polyesters include condensates of a lower alkylene glycol such as ethylene glycol or butylene glycol with dicarboxylic acids, for example, condensates of 1,4 butane diol with mixed terephthalate and isophthalate components in the molar ratio of from about 1:1 to about 4:1 and condensates of mixed ethylene glycol and 1,4 butane diol and mixtures of these with mixed terephthalate, isophthalate and sebacate components in percentages of 40% to 60% terephthalate, 20% to 50% isophthalate and 10% to 20% sebacic.

Completion of the sole attaching process involves heating of the sole attaching surface 32 of an upper 30 by any conventional means, usually by disposing the upper 30 on a rack 34 spaced from the radiant heating unit 36 employed for action on the outsole 10 (see FIG. 3). The outsole 10 is positioned on a rack 38 relative to the radiant heating unit 36 so that the radiant heat falls on the adhesive band or film 24. The band or film 24 of adhesive is at least partially transparent to the radiant heat so that a proportion of the heat passes through the adhesive and is absorbed by the outsole material underlying the adhesive. Since this radiant heating is only for a time and intensity sufficient to soften the adhesive and does not soften the outsole significantly, effective sole attaching with good outsole character is obtained.

After heating of the bottom 32 of the shoe upper 30 and radiant heating of the film 24 of adhesive and portions of the outsole 10 underlying the film, the outsole 10 is positioned on the bottom 32 of the shoe upper 30. The adhesive film 24 although somewhat rubbery in its heated condition, has a visco-elastic nature which allows at least limited sliding of the outsole 10 relative to the shoe upper 30. Also, the heated portions of outsole material underlying the adhesive constitutes a store of sensible heat so that great rapidity of assembling the outsole and upper is not essential.

After positioning of the outsole 10 on the bottom of the shoe upper 30, the assembled shoe upper 30 and outsole 10 are placed in a sole attaching press 40 (see FIG. 4) and subjected to sole attaching pressure. Surprisingly, notwithstanding the amount of time which is available for assembling of the outsole and upper, pressure in the sole attaching press 40 may be released in a matter of only a few seconds. The ability of the adhesive to hold the outsole 10 firmly on the shoe upper 30 after so short a time is due in some measure to the fact that the heated attaching surface portions of the upper permit excellent penetration of the molten adhesive, i.e., do not chill penetrating portions of the adhesive to constitute a block against further penetration. This excellent penetration and/or wetting of the shoe upper by the adhesive reduces the thickness of the adhesive between outsole and upper and when sole attaching pressure is applied create a geometry between the outsole and shoe upper in which the adhesive may function most effectively.

The following examples are given to aid in understanding the invention. It is to be understood that the invention is not restricted to the particular materials, proportions or procedural details set forth in the examples.

*Example 1*

A polyester was prepared by the reaction and condensation of 1,4 butane diol with a mixture comprising 3,4 mols or terephthalic acid, 5 mols isophthalic acid and 1.6 mols sebacic acid. Condensation was carried to the extent of providing a resin having a melting point of 94 to 105° C. (ring and ball) and viscosity of 35,000 cps. as determined with Brookfield Viscometer at 215° C. using the #4 spindle at 120 rpm. This resin was formed into a rod of about ¼ inch major thickness.

The rod of resinous adhesive was fed to a melting device disposed to provide molten adhesive to an outsole cementer. The melting device and the cementer were adjusted to deliver molten resinous material to the surface of an outsole compounded of a vulcanized butadiene-styrene copolymer synthetic rubber. The molten resinous material was applied at a temperature of 430° F. and the sole feeding device and nozzle were adjusted to deposit a band of adhesive 0.010 inch thick and ½ inch wide on the attaching marginal surface of the outsole.

The outsole was disposed with the adhesive still in molten condition beneath an infra-red radiation source set to operate with intermittent power supply adjusted for 90% input, the time of exposure being 15 seconds. This radiation increased the temperature of the outsole material at the interface between the adhesive and the outsole material to about 95° C. so that the surface of the outsole material was softened and became intimately associated with molten adhesive. The outsole was removed from the radiant heater and allowed to cool.

Thereafter the outsole was subjected to infra-red heat set for 95% input for 4 seconds to soften the adhesive. The bottom of a shoe upper was exposed to infra-red radiation for 4 seconds with the radiant heat source set at 90% input. This raised the temperature of the attaching surface of the shoe upper to about 120° to about 165° F. The outsole was then spotted on the upper and the assembly then placed in a sole attaching press. Pressure was applied to the extent of 200 lbs. total pressure on the assembly, and after 10 seconds the pressure was removed. On examination it was found that the sole was firmly attached to the shoe upper, that the edges of the sole were very tight to the upper and that there had been no squeeze out of the adhesive.

*Example II*

The procedure of Example I was repeated except that the first heating of the outsole with resin adhesive thereon was omitted. On examination it was found that the bond between the adhesive and the outsole was uneven and that the sole attaching strength was inadequate.

*Example III*

The procedure of Example I was repeated but the first heating of the outsole with the adhesive cement thereon was substituted by procedure involving placing the sole with adhesive thereon in an oven at 90° C. for 30 minutes. After this heating, the sole was removed from the oven and allowed to cool. Thereafter the adhesive on the outsole was heated and pressed against the heated attaching surface of an upper in accordance with the procedure of Example I. On examination it was found that the sole was strongly attached to the shoe upper, that the edges of the sole were very "tight" to the upper and that there had been no squeeze out of adhesive.

*Example IV*

A cured polychloroprene composition outsole was heated for 15 seconds in an infra-red heater set at 90% input and thereafter molten adhesive is applied to the heated surface of the outsole in accordance with the procedure of Example I. Due to the softness of the outsole in heated condition special care has to be exercised in feeding the outsole past the cementer nozzle. The outsole and adhesive thereon are allowed to cool and thereafter subjected to a radiant heat source and assembled against the heated bottom of a shoe upper in accordance with the procedure of Example I Satisfactory sole attaching was obtained.

Having thus described our invention, what we claim as new and desire to secure by Letters Patent of the United States is:

1. The one-way adhesive process of permanently attaching a cured diene rubber body to a second body which comprises depositing a layer of substantially volatile solvent-free adhesive in molten condition on the attaching surface areas of said diene rubber body, supplying heat to said attaching surface at an intensity and for a time period sufficient to supply heat to soften the diene rubber material at the surface of said body to cause said molten adhesive to wet and associate with the surface of said diene rubber body, cooling said diene rubber body, directing radiant heat at said layer of adhesive to soften it to adhesive condition, heating the attaching surface of said second body, pressing said bodies together with said layer in heat softened condition between them to squeeze said layer into substantially all over intimate relation with irregularities in the attaching surface of said second body and cooling said adhesive to give a strong permanent bond between said bodies.

2. The one-way adhesive process of permanently attaching a cured diene rubber shoe sole to an upper which comprises depositing a layer of substantially volatile solvent-free thermoplastic adhesive in molten condition on the attaching marginal surface areas of the sole, supplying heat to said attaching marginal surface of the sole at an intensity and for a time period sufficient to supply heat to soften the sole material at the attaching surface to cause said molten adhesive to wet and associate with the diene rubber at said surface, cooling said sole and adhesive layer thereon, directing radiant heat at said layer of adhesive to soften it to adhesive condition, heating the sole attaching surface of said upper, pressing said sole and upper together with said film in heat softened condition between them to squeeze said layer into substantially all over intimate relation with irregularities in said sole attaching surface of said upper and cooling said adhesive to give strong permanent bonding of the sole to the upper.

3. The one-way adhesive process of permanently attaching a cured diene rubber shoe sole to an upper which comprises depositing a layer of substantially volatile and vent-free substantially radiant heat-transparent thermoplastic adhesive in molten condition on the attaching marginal surface areas of the sole, thereafter directing radiant heat at said attaching marginal surface of the sole at an intensity and for a time period sufficient to supply heat to soften the sole material at the attaching surface to cause said molten adhesive to wet and associate with the diene rubber at said surface, cooling said sole and adhesive film thereon, directing radiant heat at said film of adhesive to soften it to adhesive condition, heating the sole attaching surface of said upper, pressing said sole and upper together with said film in heat softened condition between them to squeeze said film into substantially all over intimate relation with irregularities in said sole attaching surface of said upper and cooling said film to give strong permanent bonding of the sole to the upper.

4. The one-way adhesive process of permanently attaching a cured diene rubber shoe sole to an upper which comprises depositing a layer of substantially volatile solvent-free substantially infra-red radiation-transparent thermoplastic adhesive in molten condition on the attaching marginal surface areas of the sole, said layer of adhesive being from about 0.005 to about 0.05 inch in thickness, thereafter directing infra-red radiation at said attaching marginal surface of the sole at an intensity and for a time period sufficient to supply heat to soften the sole material at the attaching surface to cause said molten adhesive to wet and associate with the diene rubber at said surface, cooling said sole and adhesive layer thereon, directing infra-red radiation at said layer of adhesive to heat soften it to adhesive condition, heating the sole attaching surface of said upper, pressing said sole and upper together with said layer in heat softened condition between them to squeeze said layer into substantially all over intimate relation with irregularities in said sole attaching surface of said upper and cooling said film to give strong permanent bonding of the sole to the upper.

5. The one-way adhesive process of permanently attaching a cured diene rubber shoe sole to an upper which comprises depositing a layer of substantially volatile solvent-free substantially infra-red radiation-transparent thermoplastic adhesive in molten condition on the attaching marginal surface areas of the sole, said adhesive comprising a major portion of a thermoplastic linear polyester resin having a melting point in the range of from about 80° C. to about 160° C., said adhesive hardening to a strong tough condition at a temperature of at least 40° C., said layer of adhesive being from about 0.005 to about 0.05 inch in thickness, thereafter directing infra-red radiation at said attaching marginal surface of the sole to raise the temperature of the sole material at the attaching surface to at least about 50° C. to soften the surface of said sole material to cause said molten adhesive to wet and associate with the diene rubber at said surface, cooling said sole and adhesive layer thereon, directing infrared radiation at said layer of adhesive to heat soften it to adhesive condition, heating the sole attaching surface of said upper, pressing said sole and upper together with said layer in heat softened condition between them to squeeze said layer into substantially all over intimate relation with irregularities in said sole attaching surface of said upper and cooling said film to give strong permanent bonding of the sole to the upper.

References Cited by the Examiner

UNITED STATES PATENTS

| 2,760,215 | 8/1956 | Newton et al. | 156—290 |
| 2,804,120 | 8/1957 | Dancewicz | 156—306 |

FOREIGN PATENTS

| 379,985 | 9/1932 | Great Britain | 156—308 |

FRANK J. COHEN, *Primary Examiner.*

EARL M. BERGERT, *Examiner.*